US012662333B2

(12) United States Patent
Leidig et al.

(10) Patent No.: US 12,662,333 B2
(45) Date of Patent: Jun. 23, 2026

(54) DEVICE FOR REMOVING INDIVIDUAL PHARMACEUTICAL VESSELS FROM A TROUGH-SHAPED TRANSPORT CONTAINER, A SYSTEM COMPRISING A CORRESPONDING DEVICE, AND A METHOD FOR REMOVING INDIVIDUAL PHARMACEUTICAL VESSELS FROM A TROUGH-SHAPED TRANSPORT CONTAINER

(71) Applicant: Syntegon Technology GmbH, Waiblingen (DE)

(72) Inventors: Jürgen Leidig, Frankenhardt (DE); Florian Weber, Crailsheim (DE); Margarita Jungblut, Satteldorf (DE)

(73) Assignee: Syntegon Technology GmbH, Waiblingen (DE)

( * ) Notice: Subject to any disclaimer, the term of this patent is extended or adjusted under 35 U.S.C. 154(b) by 0 days.

(21) Appl. No.: 19/121,883

(22) PCT Filed: Aug. 29, 2023

(86) PCT No.: PCT/EP2023/073612
§ 371 (c)(1),
(2) Date: Apr. 17, 2025

(87) PCT Pub. No.: WO2024/110082
PCT Pub. Date: May 30, 2024

(65) Prior Publication Data
US 2026/0131982 A1 May 14, 2026

(30) Foreign Application Priority Data

Nov. 23, 2022 (DE) ..................... 10 2022 131 001.9

(51) Int. Cl.
| | |
|---|---|
| *B65G 47/91* | (2006.01) |
| *B65G 65/00* | (2006.01) |
| *B25J 15/06* | (2006.01) |

(52) U.S. Cl.
CPC ............. *B65G 47/91* (2013.01); *B65G 65/00* (2013.01); *B25J 15/0683* (2013.01); *B65G 2201/0244* (2013.01); *B65G 2207/10* (2013.01)

(58) Field of Classification Search
CPC ................... B65G 47/91; B65G 65/00; B65G 2201/0244; B65G 2207/10; B25J 15/0683
(Continued)

(56) References Cited

U.S. PATENT DOCUMENTS

| | | | |
|---|---|---|---|
| 3,270,903 A | 9/1966 | George | |
| 3,982,625 A * | 9/1976 | Wentz | ................... B65G 47/50 |
| | | | 198/572 |

(Continued)

FOREIGN PATENT DOCUMENTS

| | | |
|---|---|---|
| CN | 2717649 Y | 8/2005 |
| CN | 101337588 A | 1/2009 |

(Continued)

OTHER PUBLICATIONS

International Search Report and Writen Opinion for Application No. PCT/EP2023/073612 dated Nov. 23, 2023 (18 pages including English machine translation).

(Continued)

*Primary Examiner* — Paul T Chin
(74) *Attorney, Agent, or Firm* — Michael Best & Friedrich LLP

(57) ABSTRACT

A device (13) for removing individual pharmaceutical vessels (2) from a trough-shaped transport container (1), a system (40) having a corresponding device (13), and a
(Continued)

method for removing individual pharmaceutical vessels (2) from a trough-shaped transport container (1) are proposed.

15 Claims, 5 Drawing Sheets

(58) Field of Classification Search
USPC ................................................ 294/183, 188
See application file for complete search history.

(56) References Cited

U.S. PATENT DOCUMENTS

| | | | | |
|---|---|---|---|---|
| 4,819,785 | A | * | 4/1989 | Ichizawa ............... B29C 31/002 |
| | | | | 198/470.1 |
| 11,862,727 | B2 | * | 1/2024 | Feng .................. H10D 30/6213 |
| 2013/0200916 | A1 | * | 8/2013 | Panagas .................. H04M 1/24 |
| | | | | 324/757.01 |
| 2015/0205288 | A1 | * | 7/2015 | Strong ............... G05B 19/4185 |
| | | | | 700/114 |
| 2024/0024922 | A1 | * | 1/2024 | Kim ........................ B07C 5/362 |

FOREIGN PATENT DOCUMENTS

| | | | |
|---|---|---|---|
| CN | 207596026 | U | 7/2018 |
| CN | 108945676 | A | 12/2018 |
| CN | 109229673 | A | 1/2019 |
| CN | 208790098 | U | 4/2019 |
| CN | 208931840 | U | 6/2019 |
| CN | 209139652 | U | 7/2019 |
| CN | 111361813 | A | 7/2020 |
| CN | 112368211 | A | 2/2021 |
| CN | 112659345 | A | 4/2021 |
| CN | 112776160 | A | 5/2021 |
| CN | 214293682 | U | 9/2021 |
| DE | 102007024771 | A1 | 9/2008 |
| DE | 202010008173 | U1 | 11/2011 |
| DE | 202021102751 | U1 | 8/2022 |
| KR | 101462264 | B1 | 11/2014 |

OTHER PUBLICATIONS

European Patent Office Examination Report for Application No. 102022131001.9 dated Jun. 30, 2023 (13 pages including English machine translation).
Chinese Patent Office Action for Application No. 202380080305.5 dated Sep. 5, 2025 (25 pages including English machine translation).
Chinese Patent Office Action for Application No. 202380080305.5 dated Jan. 24, 2026 (16 pages including English machine translation).

* cited by examiner

DEVICE FOR REMOVING INDIVIDUAL PHARMACEUTICAL VESSELS FROM A TROUGH-SHAPED TRANSPORT CONTAINER, A SYSTEM COMPRISING A CORRESPONDING DEVICE, AND A METHOD FOR REMOVING INDIVIDUAL PHARMACEUTICAL VESSELS FROM A TROUGH-SHAPED TRANSPORT CONTAINER

BACKGROUND

The present invention relates to a device for removing individual pharmaceutical vessels from a trough-shaped transport container. Moreover, the present invention relates to a system comprising a corresponding device and a trough-shaped transport container in which individual pharmaceutical vessels are stored. Furthermore, the present invention relates to a method for removing individual pharmaceutical vessels from a trough-shaped transport container.

In the pharmaceutical industry, medications or active medical substances are often filled into individual pharmaceutical vessels. Examples of individual vessels of this kind include vials or small injection bottles, syringes, or cartridges. Individual pharmaceutical vessels are traditionally stored in trough-shaped transport containers, particularly before these individual vessels are filled with medications or active medical substances. An example of a trough-shaped transport container is a so-called tray, in which individual pharmaceutical vessels are usually stored standing loosely side by side.

Typically, trough-shaped transport containers with individual pharmaceutical vessels packed therein are handled in automated fashion. Removing the individual vessels is a particularly challenging handling step, especially when they are stored loosely side by side. There are devices known in the art that use gravity-assisted removal of the individual vessels from the transport container. Devices of this kind generally comprise a plate-like support structure with a particularly horizontal support surface. The transport container, along with the individual vessels, can be arranged on the support structure in such a manner that the underside of a base of the transport container faces away from the support surface and the individual vessels are arranged either on the support surface or spaced vertically above the support surface. Devices known in the art also typically include a removal mechanism for removing the transport container from the individual pharmaceutical vessels. However, the following problem may arise during removal. If an individual vessel is held by frictional forces and/or electrostatic attraction to the transport container, it does not remain on the support surface when the transport container is removed, but is instead removed from the support structure along with the transport container. This effect can impact multiple individual vessels. The individual vessel or individual vessels concerned are then rendered unavailable for the subsequent processing step or have to be removed from the transport container manually and arranged on the support surface.

SUMMARY

The invention is based on the object of providing a possible solution for removing individual pharmaceutical vessels from a trough-shaped transport container, wherein secure separation of the individual vessels from the transport container should be ensured.

This problem is solved according to the invention by a device, a system and a method.

The description specifies advantageous variants and embodiments.

According to the invention, a device is therefore provided for removing individual pharmaceutical vessels, in particular vials, from a trough-shaped transport container, in particular a tray. The device comprises a plate-like support structure with a particularly horizontally extending support surface. The plate-like support structure is preferably the tabletop of a support table. The transport container can be arranged on the support structure in such a manner that the underside of a base of the transport container faces away from the support surface and the individual vessels are arranged on the support surface or spaced vertically above the support surface. Each of the individual vessels may therefore be arranged on the support surface or spaced vertically above the support surface. In particular, some of the individual vessels are arranged on the support surface and some are spaced vertically above the support surface. If an individual vessel is arranged on the support surface, said individual vessel rests on the support surface. This is typically the case for individual vessels that have already been released from the transport container. However, if frictional forces and/or electrostatic attraction act between an individual vessel and the transport container, said individual vessel may also be held in the transport container and arranged spaced vertically above the support surface.

The device further comprises a removal mechanism for removing the transport container from the individual vessels. Various possible configurations of the removal mechanism are explained in greater detail below.

It is proposed that the support structure is assigned a vibration-generating unit that is designed to induce a vibrational movement in the support structure at least intermittently during the removal process, which vibrational movement can be transmitted to the transport container and/or the individual vessels, in order to facilitate their detachment from the transport container. As previously mentioned, one or multiple individual vessels may remain attached to the transport container due to frictional forces and/or electrostatic attraction. The vibrational movement applies acceleration forces to individual vessels of this kind, as a result of which the individual vessels are released from the transport container. As a result when the transport container is removed, all individual vessels are actually left behind and are arranged on the support surface at the end of the removal process.

Preferably, the vibration-generating unit is configured to induce horizontal vibrational movement in the support structure. With a horizontal vibrational movement, the support structure is displaced horizontally from its initial state. Alternatively, the vibration-generating unit is designed to induce a vertical vibrational movement in the support structure, in other words a vibrational movement in which the support structure is displaced vertically from its initial state. The vibration-generating unit may also induce a vibrational movement of the support structure, in which the support structure is displaced from its initial state in both horizontal and vertical directions.

The device preferably comprises a turning mechanism for inverting the transport container along with the individual vessels arranged therein. Typically, before the removal process, the transport container is handled in such a manner that the underside of the base is oriented facing vertically downwards. It is thereby possible to prevent the individual vessels from falling out of the transport container. For the gravity-assisted removal process, however, the transport container must be inverted, so that the underside of the base of the transport container faces vertically upwards. The turning mechanism is provided for this purpose. Suitable turning mechanisms are known in the art. Turning mechanisms of this kind typically comprise a turning unit that can be pivoted about a horizontally extending axis. The turning unit comprises a turning plate and at least one holding structure to securely retain the transport container. The transport container can be inserted into the holding structure, wherein the turning plate is arranged vertically above the inserted transport container. If the turning unit is rotated through 180° with the transport container held, the transport container is inverted. The turning plate is arranged vertically below the transport container after the rotation is complete, so that said turning plate prevents the individual vessels from falling out of the inverted transport container.

In a preferred embodiment it is provided that the vibration-generating unit comprises at least one vibration generator integrated into the support structure, and/or that the vibration-generating unit comprises at least one vibration generator that can be operated independently of the support structure and is mechanically coupled to the support structure.

The vibration-generating unit preferably comprises at least one unbalanced motor and/or at least one magnetic vibrator as the vibration generator. An unbalanced motor is a rotary machine that comprises a motor shaft with an imbalance, so that circular mechanical vibrational movements are generated during operation due to the resulting centrifugal forces. Vibrational movements in the support structure can be effectively induced by means of an unbalanced motor. A magnetic vibrator comprises at least one controllable electromagnet. The electromagnet is arranged in such a manner that by controlling the electromagnet, a vibrational movement in the support structure can be induced. Vibrational movements in the support structure can also be effectively induced by a magnetic vibrator. In addition, there is the advantage that a desired vibration direction can be precisely achieved. The vibration generator is preferably arranged on an underside, on a longitudinal side, or on a transverse side of the plate-shaped support structure.

The removal mechanism preferably comprises at least two lifting elements for lifting the transport container, wherein the lifting elements are arranged on opposite sides of the support surface to one another and can be moved perpendicular to the support surface. The support surface is therefore arranged between the two lifting elements. By moving the lifting elements, an upward force can be applied to the transport container, causing it to be lifted. This kind of lifting of the transport container leads at most to a slight deformation of the transport container. If the transport container were significantly deformed, the removal of the individual vessels could be complicated, as they might become wedged inside the transport container. Because the lifting elements are arranged on opposite sides of the support surface from one another, any tipping of the transport container during lifting by the lifting elements is safely prevented. The lifting elements preferably each have an initial sliding position in which the lifting surfaces of the lifting elements are flush with the support surface. The lifting elements are preferably mechanically coupled with one another in such a manner as to allow only synchronized movement. The two lifting elements then preferably form different lifting sections of the same lifting unit. Alternatively, the lifting elements can be moved independently of one another in a direction perpendicular to the support surface. The desired synchronized movement of the lifting elements is then achieved by a corresponding control system that controls the actuators assigned to the lifting elements.

According to a preferred embodiment, it is provided that the lifting elements are arranged at different edges of the support surface in each case and that the lifting elements each comprise a guide surface that provides effective support for multiple individual vessels arranged on the support surface. By being arranged at opposite edges of the support surface, the lifting elements enclose the support surface at the respective edges. The lifting elements thereby prevent individual vessels from falling off the support surface in the area in which they are arranged. In this case, each of the lifting elements comprises a guide surface that provides effective support for multiple individual vessels arranged on the support surface. Due to their size, the guide surfaces can therefore each support multiple individual vessels simultaneously, as a result of which effective guidance of the individual vessels by means of the lifting elements is achieved. The lifting elements, or the guide surfaces thereof, preferably each extend along the entire edge on which the respective lifting element is arranged. The support surface preferably has a rectangular design, wherein the lifting elements are then arranged another longitudinal edge of the support surface in each case or at another transverse edge of the support surface in each case.

The removal mechanism preferably comprises a gripping unit for gripping the transport container. In this case, for example, the unit may be designed to grip the transport container by means of vacuum suction and/or to grip the transport container by means of frictional force and/or to grip the transport container by means of positive locking. The gripping unit is preferably present in addition to the previously described lifting elements. This is particularly advantageous in relation to the removal of the transport container from the individual vessels. Initially, the transport container can be lifted by the lifting elements. Only when the transport container has been lifted by the lifting elements is the transport container gripped by the gripping unit and removed. The gripping unit may, however, also be present instead of the lifting elements.

According to a preferred embodiment, it is provided that the gripping unit comprises at least one suction element for adhering to the underside of the base of the transport container, wherein the suction element, in particular, is arranged on a support structure of the gripping unit. The underside of the base of a transport container is typically well-suited for suction adherence, which is why this gripping unit design is preferred. The gripping unit preferably comprises multiple suction elements that collectively define a suction plane. However, there may also be only one suction element present which then defines the suction plane alone.

According to a preferred embodiment, it is provided that the gripping unit comprises a handling surface for handling a side wall of the trough-shaped transport container, wherein the handling surface is oriented at an angle to the suction plane of the gripping unit. This handling surface allows the transport container, along with its individual vessels arranged therein, to be moved onto the support structure, in particular by sliding the transport container. The angle between the suction plane and the handling surface preferably ranges from 60° to 120°, more preferably from 80° to 100°. Most preferably, the handling surface is oriented perpendicular to the suction plane. A handling unit comprising the handling surface is preferably fastened to the support structure of the gripping unit, for example via a strut that extends preferably parallel to the suction plane.

According to a preferred embodiment, the device comprises a handling mechanism designed to move the gripping unit towards the transport container. The handling mechanism is preferably designed to grip the gripping unit, in particular the support structure of the gripping unit. The handling mechanism may be implemented as a four-axis or six-axis robot, for example.

According to a preferred embodiment, the device comprises an ion spray mechanism for reducing electrostatic attraction between the individual vessels and the transport container. The ion spray mechanism can further enhance the separation of the individual vessels from the transport container. The ion spray mechanism preferably comprises at least one ion spray bar.

The system according to the invention comprises a trough-shaped transport container, in particular a tray, in which individual pharmaceutical vessels, in particular vials, are stored, and a device having the features described above for removing the individual vessels from the transport container.

In relation to the advantages that can be achieved with the system, reference is made to the related descriptions of the device and the method. The features described in connection with the device and the method can be used to further refine the system.

According to a preferred embodiment of the system, it is provided that the transport container comprises a particularly circumferential edge that encloses a receptacle of the transport container for the individual vessels, and edge portions of the edge of the transport container lying opposite one another can be simultaneously arranged on a lifting surface of another of the lifting elements in each case. The edge preferably comprises a continuous overhang. This allows for a particularly secure arrangement of the transport container on the lifting surfaces of the lifting elements.

The method according to the invention for removing individual pharmaceutical vessels, in particular vials, from a trough-shaped transport container, in particular a tray, comprises:

Arranging the transport container on a support structure with a particularly horizontally extending support surface, wherein an underside of a base of the transport container faces away from the support surface, and wherein the individual vessels are arranged on the support surface or spaced vertically above the support surface. In essence, the transport container, along with the individual vessels arranged therein, is therefore inverted on the support structure. Preferably, a turning device first inverts the transport container with the individual vessels arranged therein, so that the underside of the base then faces vertically upwards. Subsequently, the transport container with the individual vessels is moved from the turning device onto the support structure. The transport container with the individual vessels arranged therein is preferably slid from the turning device onto the support structure.

Removing the transport container from the individual vessels, wherein the support structure is at least intermittently induced to perform a particularly horizontal vibrational movement during a removal process which is transmitted to the transport container and/or the individual vessels, in order to detach the individual vessels from the transport container. The initiation of the vibrational movement can occur at various points in time or intervals during the removal process. The support structure is preferably induced to oscillate at least intermittently during the removal of the transport container.

Advantages and potential developments of the device should also be understood as applying to the method and, conversely, advantages and potential developments of the method should also be understood as applying to the device.

According to a preferred embodiment of the method, it is provided that the transport container is first lifted by an upwardly directed force away from the support surface and that the lifted transport container is gripped and removed. Gripping the transport container can cause deformation. If the transport container were to be gripped directly, the resulting deformation could hinder the removal of the individual vessels. On the other hand, lifting by means of a compressive force results in only minimal deformation of the transport container. Since the transport container is initially lifted by a compressive force, it is already separated from the individual vessels before it is subsequently gripped, so that a particularly safe removal of the individual vessels is ultimately guaranteed.

According to a preferred embodiment, it is provided that the support structure is induced to vibrate during lifting by the compressive force. As a result of this, a particularly effective separation of the individual vessels is achieved. In particular, the vibrational movement is transmitted to the transport container via lifting elements that apply the compressive force to the transport container. Preferably, stimulation of the vibrational movement ceases no later than when the transport container is gripped. Continuing the vibrational movement after the transport container has been removed could result in one or multiple individual vessels toppling over.

BRIEF DESCRIPTION OF THE DRAWINGS

The invention is described in greater detail below with reference to the figures, wherein identical or functionally identical elements are, if applicable, designated with reference signs only one. The description of the figures serves as an example and is not intended to be limiting. In the drawings.

DETAILED DESCRIPTION

Figure 1:
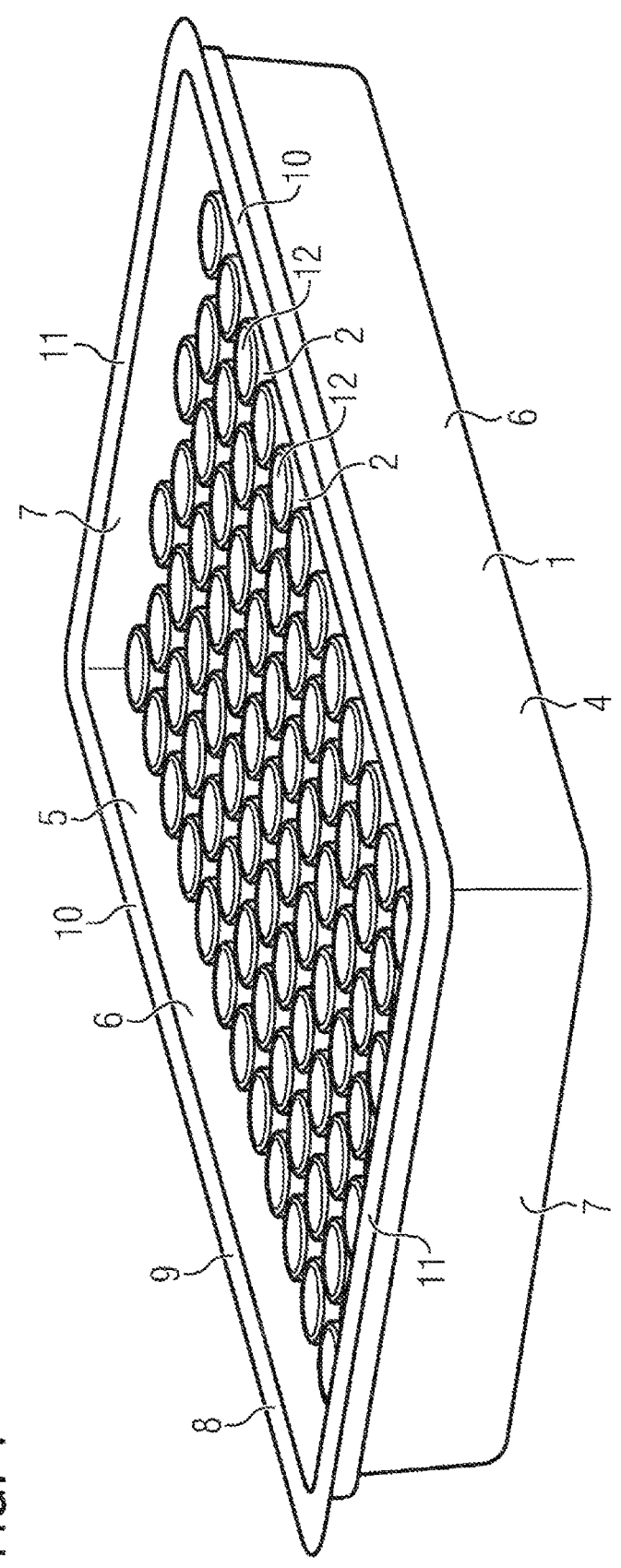
FIG. 1: shows a perspective view of a transport container with individual pharmaceutical vessels arranged therein.

FIG. 1 shows a transport container 1 with a plurality of individual pharmaceutical vessels 2 arranged therein.

The transport container 1 has a trough-shaped design. For this purpose, the transport container 1 comprises a base 3 that cannot be seen in FIG. 1 and a surrounding side wall 4. The side wall 4 encloses a receptacle 5 of the transport container 1, in which the individual vessels 2 are arranged. The transport container 1 is rectangular in shape in the present case. For this purpose, the side wall 4 comprises two mutually opposing longitudinal sides 6 and two mutually opposing transverse sides 7. An end of the side wall 4 distal to the base 3 forms an edge 8 of the transport container 1.

The edge 8 comprises a continuous overhang 9. Given the rectangular shape of the transport container 1, the edge 8 comprises two mutually opposing longitudinal edges 10 and two mutually opposing transverse edges 11. In this context, the transport container 1 is a tray 1.

The individual pharmaceutical vessels 2 are designed as vials 2 or injection bottles 2 in the present case. The undersides 12 of the individual vessels 2 are oriented away from the base 3 of the transport container 1. The individual vessels 2 are arranged loosely adjacent to one another in the receptacle 5 of the transport container 1.

In the following, a device 13 for removing individual vessels 2 from the transport container 1 is explained in greater detail with reference to FIGS. 2 to 5. The device 13, the transport container 1, and the individual vessels 2 together form a system 40. FIGS. 2 to 5 show different depictions of the device 13 during a removal process, during which the individual vessels 2 are removed from the transport container 1. The removal process is based on gravity-assisted removal of the individual vessels 2 from the transport container 1.

Figure 2:
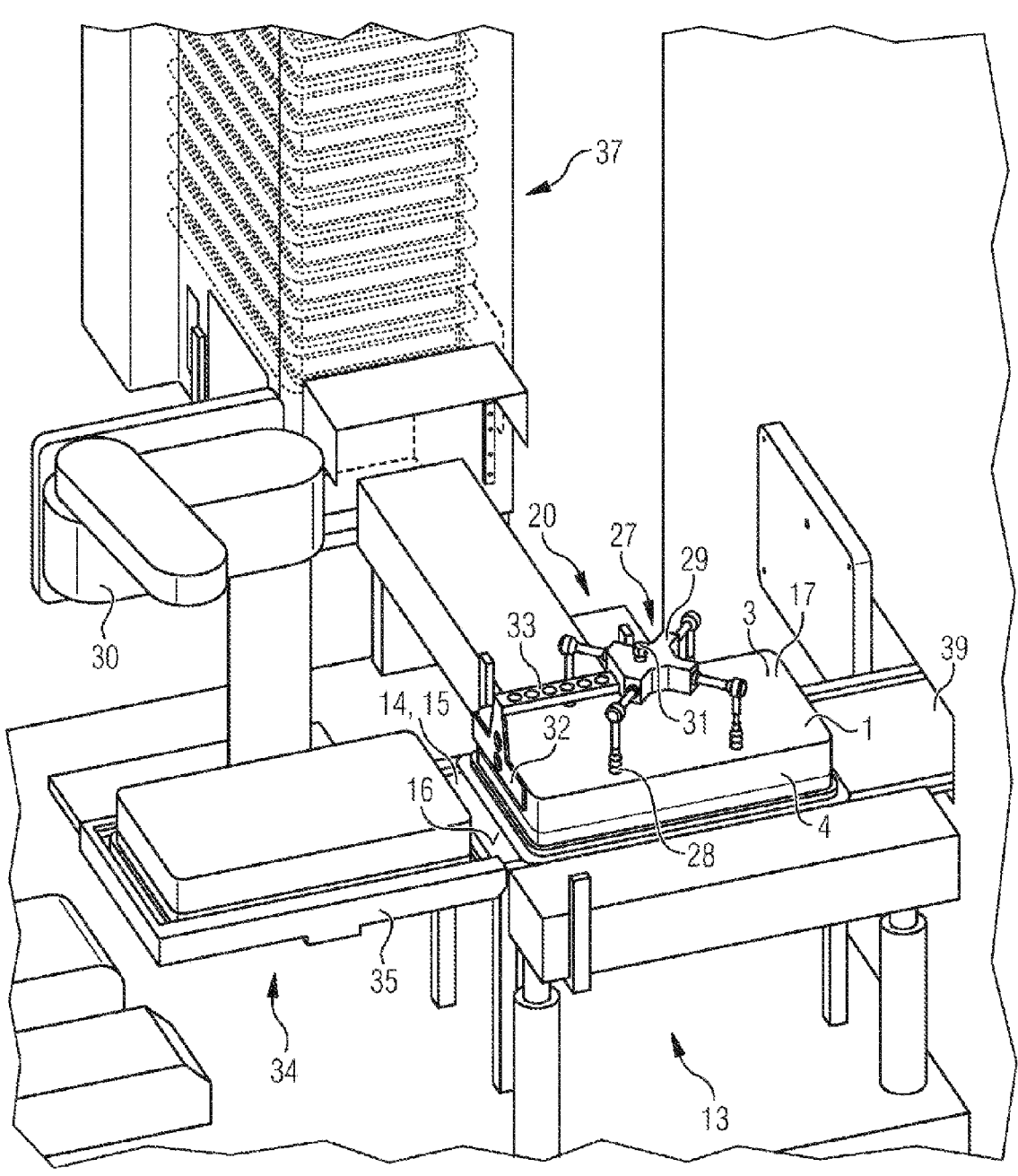
FIG. 2: shows a perspective view of a device for removing the individual vessels from the transport container.
Figure 3:
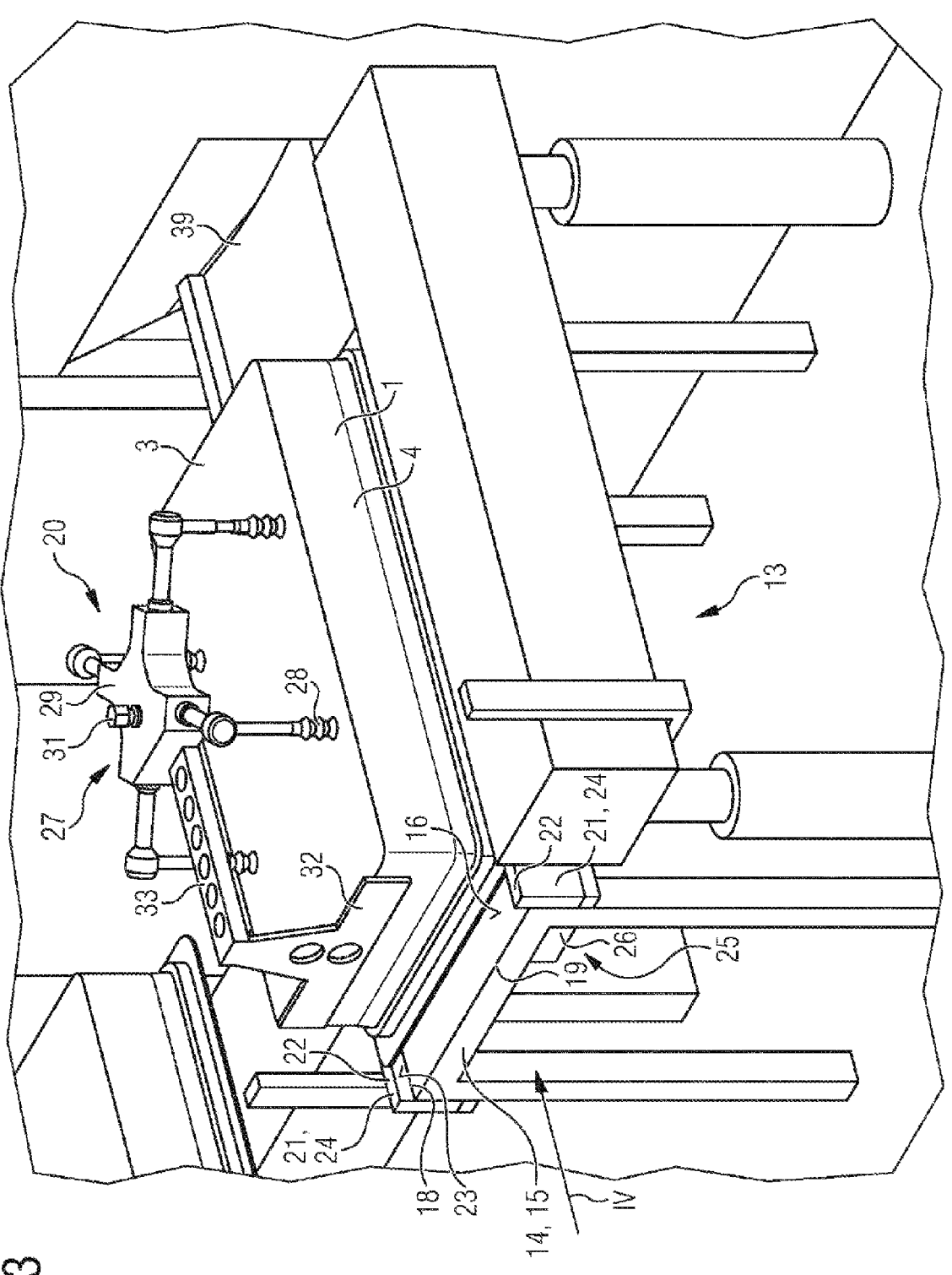
FIG. 3: shows a detail from FIG. 2 as an enlarged depiction.
Figure 4:
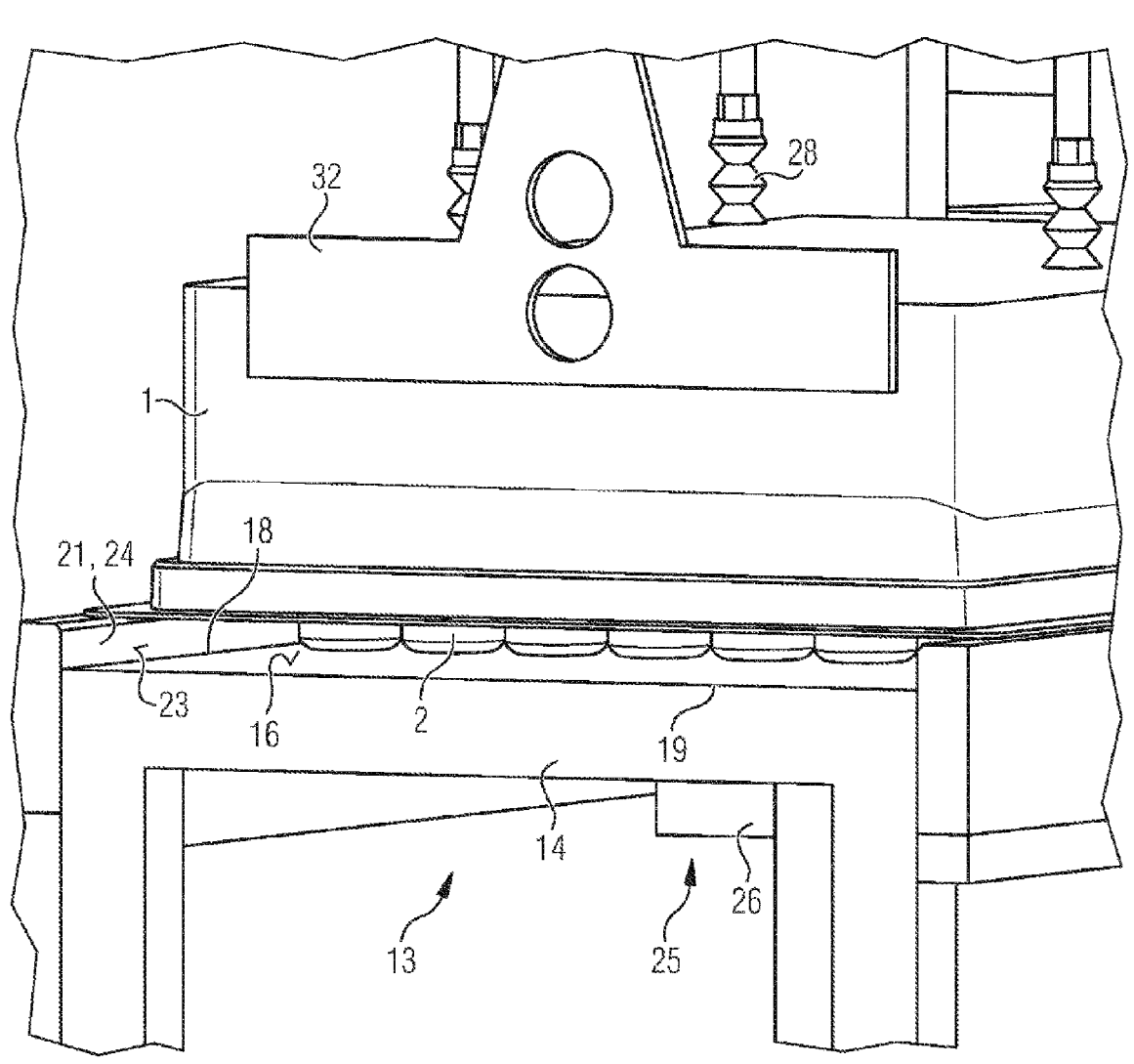
FIG. 4: shows a view from a side perspective according to a viewing direction labeled IV in FIG. 3.

The device 13 comprises a plate-shaped support structure 14. In this context, the support structure 14 is the tabletop of a support table 15. The support structure 14 comprises a horizontally extending support surface 16 oriented vertically upwards. The transport container 1 with the individual vessels 2 arranged therein can be arranged on support structure 14 such that an underside 17 of the base 3 of transport container 1 faces away from support surface 16. This kind of arrangement of transport container 1 is illustrated in FIGS. 2, 3, and 4. With this kind of arrangement of the transport container 1, the individual vessels 2 are arranged on the support surface 16 or are arranged spaced vertically above it. The support surface 16 is therefore dimensioned in such a manner as to accommodate all individual vessels 2 arranged in the transport container 1 simultaneously side by side on the support surface 16. In the present case, the support surface 16 is rectangular in design and is bounded by two mutually opposing longitudinal edges 18 and two mutually opposing transverse edges 19.

Moreover, the device 1 comprises a removal mechanism 20 for removing the transport container 1 from the individual vessels 2.

The removal mechanism 20 comprises two lifting elements 21 for lifting the transport container 1. These lifting elements 21 are arranged on mutually opposite sides of the support surface 16 and can be moved perpendicularly relative to the support surface 16. In the present case, the lifting elements 21 are mounted on the support structure 14. The lifting elements 21 are designed for joint movement in the vertical direction. The lifting elements 21 each comprise a horizontally extending lifting surface 22 that is directed vertically upwards. In an initial sliding position, the lifting elements are arranged so that the lifting surfaces 22 are flush with the support surface 16. In the final sliding position shown in FIG. 4, the lifting elements 21 are moved vertically upwards from the initial sliding position, so that the lifting surfaces 22 are arranged higher than the support surface 16 in the vertical direction.

The lifting elements 21 are arranged at opposite longitudinal edges 18 of the support surface 16. The lifting elements 21 each comprise a guide surface 23 which, in at least one sliding position of the lifting elements 21, in any event in the aforementioned final sliding position, provides effective support for multiple individual vessels 2 arranged on the support surface 16. These guide surfaces 23 are therefore sized to be able to simultaneously support multiple individual vessels 2 arranged on the support surface 16 against the guide surfaces 23. In the present case, lifting elements 21 and their guide surfaces 23 each extend along the entire length of their respective longitudinal edges 18. In this way, the individual vessels 2 are prevented from falling off the support surface 16 over the longitudinal edges 18. The lifting elements 21 form side guides 24 for the support surface 16.

In FIGS. 2, 3, and 4, the transport container 1 is arranged in such a manner that the two longitudinal edge sections 10 of the transport container 1 rest on the respective lifting surfaces 22. Consequently, the lifting elements 21 can apply a compressive force to the transport container 1 by moving it vertically upwards, in order to lift the transport container 1.

In general, lifting the transport container 1 causes the individual vessels 2 to remain on the support surface 16. However, frictional forces and/or electrostatic attraction may act between the individual vessels 2 and the transport container 1, causing the individual vessels 2 to remain attached to the transport container 1. This can result in one of the individual vessels 2 or multiple individual vessels 2 being lifted along with the transport container 1 when the transport container 1 is lifted.

To securely detach the individual vessels 2 from the transport container 1, the device 13 comprises a vibration-generating unit 25. In this context, the vibration-generating unit 25 comprises an unbalanced motor 26 as the vibration generator. The unbalanced motor 26 is arranged on an underside of the support structure 14 and mechanically coupled to the support structure 14. Through the unbalanced motor 26, the support structure 14 can be induced to perform a vibrational movement. The vibrational movement can be transmitted to the transport container 1 and/or the individual vessels 2, in particular by means of the lifting elements 21. The vibrational movement facilitates the detachment of the individual vessels 2 from the transport container 1, ensuring that all individual vessels 2 remain on the support surface 16 when the transport container 1 is lifted. In another exemplary embodiment, the vibration-generating unit comprises at least one magnetic vibrator as the vibration generator.

The removal mechanism 20 also comprises a gripping unit 27 for gripping the transport container 1. The gripping unit 27 comprises multiple suction elements 28 designed to adhere to the underside 17 of the base 3 of the transport container 1. The suction elements 28 have an elongate design and collectively define a suction plane. The suction elements 28 are arranged on a common support structure 29 of the gripping unit 27. In this instance, four suction elements 28 are present, the free suction ends of which are arranged in a rectangle, in particular a square, within the suction plane.

Moreover, the removal mechanism 20 comprises a handling mechanism 30 for handling the gripping unit 27. The handling mechanism 30 is designed to move the gripping unit 27 towards the transport container 1. In this case, the handling mechanism 30 is configured as a four-axis robot. The support structure 29 has a knob 31 on its side facing away from the suction plane, which can be gripped by the handling mechanism 30.

Furthermore, the gripping unit 27 comprises a handling unit 32 with a T-shaped design in the present case for handling the side wall 4 of the transport container 1. For this purpose, the handling unit 32 comprises a handling surface oriented at an angle to the suction plane. The function of the handling unit 32 will be explained later in connection with the process for removing the individual vessels 2. In FIGS.

2 to 5, the handling surface is in contact with the side wall 4 of the transport container 1 and is therefore not visible. Preferably, the angle between the handling surface and the suction plane is between 80° and 100°. In the present case, the handling surface is oriented perpendicular to the suction plane. The handling unit 32 is attached to the support structure 29 by a strut 33. The strut extends parallel to the suction plane in the present case.

Figure 5:
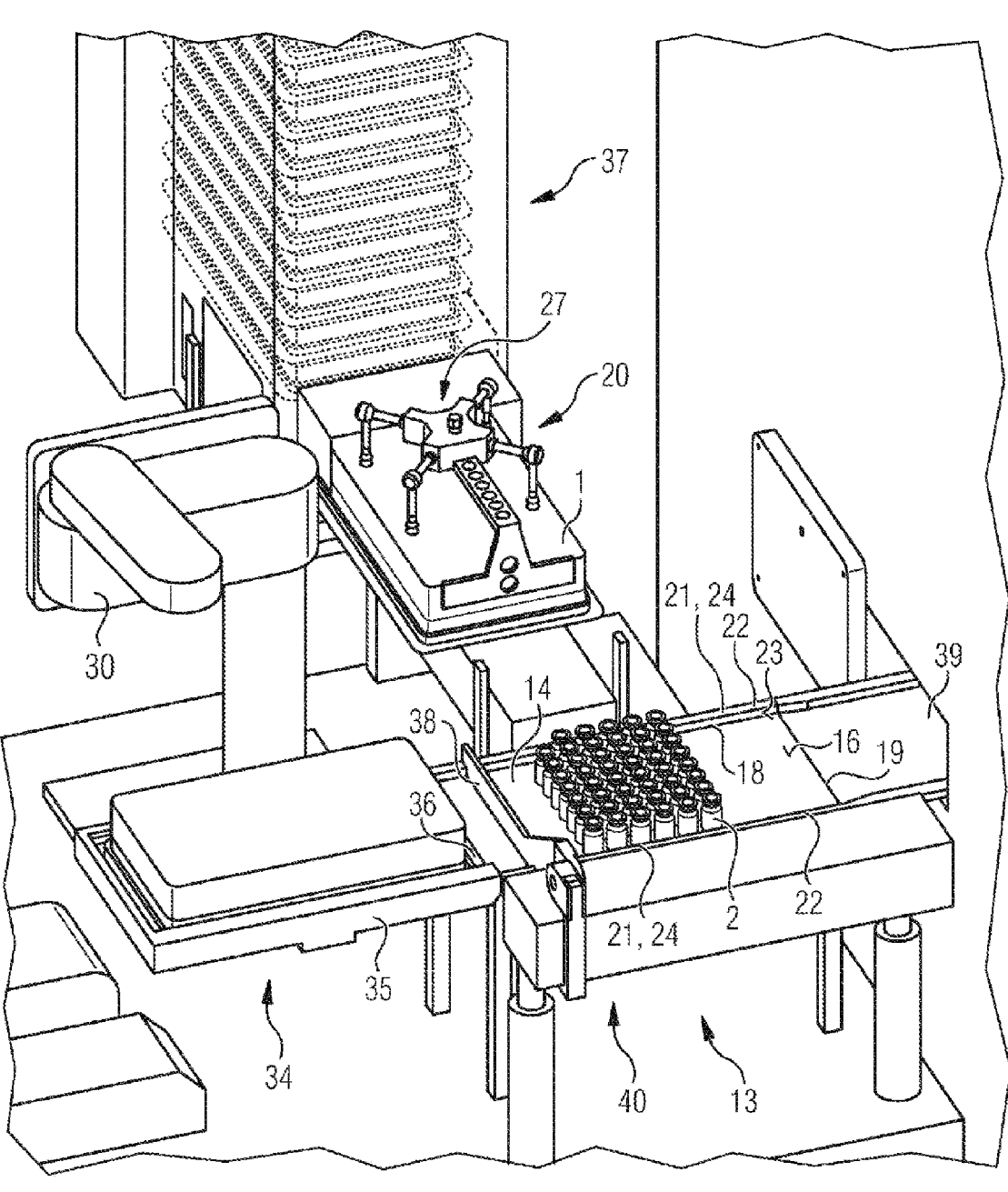
FIG. 5: shows a view corresponding to FIG. 2 following removal of the transport container.

The device 1 also includes a turning mechanism 34 for inverting the transport container 1 with the individual vessels 2 arranged therein. Typically, before the removal process, the transport container 1 is handled in such a manner that the underside 17 of the base 3 faces vertically downwards. It is thereby possible to prevent the individual vessels 2 from falling out of the transport container 1. For the gravity-assisted removal process, however, the transport container 1 must be inverted, so that the underside 17 of the base 3 faces vertically upwards, as depicted in FIGS. 2 to 5. The turning mechanism 34 is provided for this purpose. The turning mechanism 34 comprises a turning unit 35 designed to securely hold a transport container. The turning unit 35 rotates about a horizontally extending axis of rotation, in order to invert a transport container that is being held. The turning unit 35 comprises a turning plate with a support surface 36. Before the inversion, the turning plate is arranged vertically above the transport container being held. After the inversion, the inverted transport container, along with the individual vessels located therein, is arranged on the support surface 36 of the turning plate, as shown in FIGS. 2 and 5.

The device 13 also comprises a slider 38 which is spatially assigned to the support surface 16 and, for clarity, is depicted only in FIG. 5. The slider 38 can be moved along a sliding axis that extends parallel to the longitudinal edges 18 of the support surface 16, enabling it to push the individual vessels 2 arranged on the support surface 16 onto another support structure 39 of another device functionally downstream of the device 13. The slider 38 is also capable of pivoting about the sliding axis. The other device is designed, for example, to fill the individual vessels 2 with pharmaceuticals and/or medical active substances.

The following describes in greater detail a removal process carried out by means of the device 13. It is assumed in this case that, at the start of the removal process, the transport container 1 is arranged on the support surface 36 in such a manner that the underside 17 of the base 3 faces away from the support surface 36. The turning plate 35 is arranged in such a manner that the support surface 36 ends flush with the support surface 16. The slider 38 is pivoted through 90° from the pivoting position shown in FIG. 5, so that it extends perpendicular to the support surface 16.

Initially, the transport container 1 is arranged on the support structure 14 in such a manner that the underside 17 of the base 3 faces away from the support surface 16, and the individual vessels are arranged on the support surface 16 or vertically spaced above the support surface 16, as shown in FIG. 2, for example. The handling mechanism 30 preferably pushes the transport container 1 from the turning plate 35 onto the support structure 14 by means of the handling surface of the handling unit 32. During this process, the lifting elements 21 are in their initial sliding position, allowing the longitudinal edge sections 10 of the edge 8 of the transport container 1 to slide onto the lifting surfaces 22 of the lifting elements 21.

The lifting elements 21 are then moved vertically upwards. In this way, an upward force is applied to the transport container 1, causing it to be lifted. During the lifting of the transport container 1, the unbalanced motor 26 induces a vibrational movement in the support structure 14. The support structure 14 is preferably subjected to a horizontal vibrational movement. The vibrational movement is transferred to the transport container 1 and the individual vessels 2. Individual vessels 2 that remain adhered to the transport container 1 due to frictional forces and/or electrostatic attraction are separated from the transport container 1 by the vibrational movement. The individual vessels 2 therefore remain on the support surface 16 when the transport container 1 is lifted.

As soon as the lifting elements 21 have reached their end pushing position as shown in FIG. 4, the lifted transport container 1 is gripped by the gripping unit 27. The gripping unit 27 is preferably positioned on the transport container 1 for this purpose, in such a manner that the handling surface rests against the side wall of the transport container 1, as shown in FIG. 2. The gripped transport container 1 is then removed from the support structure 14 and transferred to a stacking unit 37 for transport containers. At this point, the individual vessels 2 have been removed from the transport container 1, as can be seen in FIG. 5.

The individual vessels 2 are preferably subsequently fed to the further device for further processing. For this purpose, the slider 38 is pivoted into the pivoting position shown in FIG. 5. The slider 38 is then moved along the sliding axis, as a result of which the individual vessels 2 are slid onto the additional support structure 39 of the subsequent device. The guide surfaces 23 of the lifting elements 21 in this case prevent the individual vessels 2 from falling off the support surface 16 over the longitudinal edges 18.

In relation to the points in time or intervals during which the unbalanced motor 26 induces a vibrational movement in the support structure 14, various implementations of the method are possible. The unbalanced motor 26 preferably induces the support structure 14 to vibrate at least intermittently during the lifting of the transport container 1 by the lifting elements 21. More preferably, the unbalanced motor 26 induces the support structure 14 to vibrate only during the lifting of the transport container 1 by the lifting elements 21. Consequently, before the lifting begins and after it concludes, the support structure 14 is not induced to vibrate. Alternatively, the support structure 14 is induced to vibrate before the lifting of the transport container 1 begins and/or after the lifting of the transport container 1 has concluded.

The invention claimed is:

1. A device (13) for removing individual pharmaceutical vessels (2), in particular vials (2), from a trough-shaped transport container (1), in particular a tray (1), having a plate-shaped support structure (14) that comprises a particularly horizontally extending support surface (16), wherein the transport container (1) can be arranged on the support structure (14) in such a manner that an underside (17) of a base (3) of the transport container (1) faces away from the support surface (16) and the individual vessels (2) are arranged on the support surface (16) or are arranged spaced vertically above it, and having a removal mechanism (20) for removing the transport container (1) from the individual vessels (2), characterized in that the support structure (14) is assigned a vibration-generating unit (25) that is designed to induce a particularly horizontal vibrational movement in the support structure (14) at least intermittently during the removal process, which vibrational movement can be transmitted to the transport container (1) and/or the individual vessels (2), in order to detach the individual vessels (2) from the transport container (1).

2. The device (13) as claimed in claim 1, characterized in that the vibration-generating unit (25) comprises at least one vibration generator integrated into the support structure (14), or that the vibration-generating unit (25) comprises at least one vibration generator that can be operated independently of the support structure (14) and is mechanically coupled to the support structure (14).

3. The device (13) as claimed in claim 2, characterized in that the vibration-generating unit (25) comprises at least one unbalanced motor (26) or at least one magnetic vibrator as the vibration generator.

4. The device (13) as claimed in claim 1 characterized in that the removal mechanism (20) comprises at least two lifting elements (21) for lifting the transport container (1), wherein the lifting elements (21) are arranged on opposite sides of the support surface (16) and can be moved perpendicular to the support surface (16).

5. The device (13) as claimed in claim 4, characterized in that the lifting elements (21) are arranged at different edges (18) of the support surface (16) in each case and that the lifting elements (21) each comprise a guide surface (23) that provides effective support for multiple individual vessels (2) arranged on the support surface (16).

6. The device (13) according to claim 1, characterized in that the removal mechanism (20) comprises a gripping unit (27) for gripping the transport container (1).

7. The device (13) as claimed in claim 6, characterized in that the gripping unit (27) comprises at least one suction element (28) for adhering to the underside (17) of the base (3) of the transport container (1), wherein the suction element (28), in particular, is arranged on a support structure (29) of the gripping unit (27).

8. The device (13) as claimed in claim 6, characterized in that the gripping unit (27) comprises a handling surface for handling a side wall (4) of the trough-shaped transport container (1), wherein the handling surface is oriented at an angle to the suction plane of the gripping unit (27).

9. The device (13) as claimed in claim 6, characterized in that it comprises a handling mechanism (30) designed to move the gripping unit (27) towards the transport container (1).

10. The device (13) as claimed in claim 1, characterized in that it comprises an ion spray mechanism for reducing electrostatic attraction between the individual vessels (2) and the transport container (1), wherein the ion spray mechanism particularly comprises at least one ion spray bar.

11. A system (40) comprising a trough-shaped transport container (1), in particular a tray (1), in which individual pharmaceutical vessels (2), in particular vials (2), are stored, and a device (13) as claimed in claim 1 for removing the individual vessels (2) from the transport container (1).

12. The system (40) as claimed in claim 11, characterized in that the transport container (1) comprises a circumferential edge (8) that encloses a receptacle (5) of the transport container (1) for the individual vessels (2), and that edge portions (10) of the edge (8) of the transport container lying opposite one another can be simultaneously arranged on a lifting surface (22) of another of the lifting elements (21) in each case.

13. A method for removing individual pharmaceutical vessels (2), in particular vials (2), from a trough-shaped transport container (1), in particular a tray (1), comprising:

a. Arranging the transport container (1) on a support structure (14) with a particularly horizontally extending support surface (16), wherein an underside (17) of a base (3) of the transport container (1) faces away from the support surface (16), and wherein the individual vessels (2) are arranged on the support surface (16) or spaced vertically above the support surface (16);

b. Removing the transport container (1) from the individual vessels (2), wherein the support structure (14) is at least intermittently induced to perform a particularly horizontal vibrational movement during a removal process which is transmitted to the transport container (1) and/or the individual vessels (2), in order to detach the individual vessels (2) from the transport container (1).

14. The method as claimed in claim 13, characterized in that the transport container (1) is first lifted by an upwardly directed force away from the support surface (16), and that the lifted transport container (1) is gripped and removed.

15. The method as claimed in claim 14, characterized in that the support structure (14) is induced to vibrate during lifting by the compressive force.

\*   \*   \*   \*   \*